US011862853B2

(12) United States Patent
Fourie et al.

(10) Patent No.: US 11,862,853 B2
(45) Date of Patent: Jan. 2, 2024

(54) BROAD BAND DIRECTIONAL ANTENNA

(71) Applicant: POYNTING ANTENNAS (PTY) LIMITED, Pretoria (ZA)

(72) Inventors: Andries Petrus Cronje Fourie, Johannesburg (ZA); Derek Colin Nitch, Johannesburg (ZA)

(73) Assignee: POYNTING ANTENNAS (PTY) LIMITED, Centurion (ZA)

( * ) Notice: Subject to any disclaimer, the term of this patent is extended or adjusted under 35 U.S.C. 154(b) by 208 days.

(21) Appl. No.: 17/638,488

(22) PCT Filed: Aug. 18, 2020

(86) PCT No.: PCT/IB2020/057763

§ 371 (c)(1),
(2) Date: Feb. 25, 2022

(87) PCT Pub. No.: WO2021/038381

PCT Pub. Date: Mar. 4, 2021

(65) Prior Publication Data

US 2022/0344803 A1 Oct. 27, 2022

(30) Foreign Application Priority Data

Aug. 26, 2019 (ZA) ................................. 2019/05605

(51) Int. Cl.
*H01Q 15/00* (2006.01)
*H01Q 9/04* (2006.01)
(Continued)

(52) U.S. Cl.
CPC ........... *H01Q 15/0086* (2013.01); *H01Q 1/48* (2013.01); *H01Q 1/526* (2013.01); *H01Q 9/0414* (2013.01); *H01Q 21/26* (2013.01)

(58) Field of Classification Search
CPC .. H01Q 5/40; H01Q 1/48; H01Q 5/28; H01Q 15/00; H01Q 19/10; H01Q 21/28; H01Q 15/0086; H01Q 1/526
See application file for complete search history.

(56) References Cited

U.S. PATENT DOCUMENTS 5,892,485 A * 4/1999 Glabe ................ H01Q 15/0013
343/756
2018/0205151 A1* 7/2018 Celik ....................... H01Q 5/40
(Continued)

FOREIGN PATENT DOCUMENTS

CN 105789871 7/2016

OTHER PUBLICATIONS

International Search Report for PCT/IB2020/057763 dated Nov. 16, 2020, 3 pages.
(Continued)

*Primary Examiner* — Ricardo I Magallanes
*Assistant Examiner* — Aladdin Abdulbaki
(74) *Attorney, Agent, or Firm* — Nixon & Vanderhye PC

(57) ABSTRACT

The invention provides for a broad band directional antenna (10) comprising a ground plane (12) having an axis (14) extending perpendicularly to the ground plane, an active radiator (13) which is axially spaced from the ground plane, a metamaterial ground plane assembly (16) and a conductive pillar (28.1) between the first conductive wall and the ground plane. The metamaterial ground plane assembly comprises a metamaterial ground plane (17), a first conductive wall (20) adjacent a periphery of the metamaterial ground plane, the first conductive wall having a bottom (22) and atop (24) and a second wall (26) comprising two mutually insulated conductive wall parts (26.1, 26.2) located spaced from and outside of the first conductive wall. The bottom of the first conductive wall is located between the
(Continued)

ground plane and the metamaterial ground plane and the top of the first conductive wall is located beyond the active radiator.

16 Claims, 8 Drawing Sheets

(51) Int. Cl.

| | |
|---|---|
| ***H01Q 21/26*** | (2006.01) |
| ***H01Q 1/52*** | (2006.01) |
| ***H01Q 1/48*** | (2006.01) |

(56) References Cited

U.S. PATENT DOCUMENTS

| | | | | |
|---|---|---|---|---|
| 2018/0269577 | A1 | 9/2018 | Kosaka et al. | |
| 2023/0268652 | A1 * | 8/2023 | Nitch | H01Q 15/006<br>343/727 |

OTHER PUBLICATIONS

Written Opinion of the ISA for PCT/IB2020/057763 dated Nov. 16, 2020, 6 pages.

* cited by examiner

BROAD BAND DIRECTIONAL ANTENNA

This application is the U.S. national phase of International Application No. PCT/IB2020/057763 filed Aug. 18, 2020 which designated the U.S. and claims priority to ZA Patent Application No. 2019/05605 filed Aug. 26, 2019, the entire contents of each of which are hereby incorporated by reference.

INTRODUCTION AND BACKGROUND

This invention relates to a broad band directional antenna and more particularly to a broad band cross polarised antenna.

Broad band cross polarised antennas are of considerable interest due to the large variety of frequencies used in 4G/5G and other communications systems. Broadband type dipole radiators are often arranged above a ground plane reflector surface to achieve a main beam perpendicular to the ground plane surface. This arrangement suffers from frequency limitations, since the ideal spacing for such a radiator is around a quarter wavelength above the reflector surface and which hence causes it to be half a wavelength above the reflector surface for signals having twice such frequency, resulting in destructive interference towards the main beam direction and other pattern irregularities. Metamaterials may be used artificially to delay waves at some frequencies. Hence, positioning a metamaterial ground plane between a radiator and a conductive ground plane may assist in achieving a broader bandwidth. Such assemblies are known, but radiation pattern control (i.e. maintaining the same shape at all frequencies, in other words, maintaining pattern stability) is still problematic over a wide bandwidth. This is due to pseudo surface waves which can exist between the metamaterial ground plane and conductive ground plane and many other undesirable EM interactions, amongst other reasons.

OBJECT OF THE INVENTION

Accordingly, it is an object of the present invention to provide a broad band directional antenna with which the applicant believes the aforementioned disadvantages may at least be alleviated or which may provide a useful alternative for the known antennas.

SUMMARY OF THE INVENTION

According to the invention there is provided a broad band directional antenna comprising:

- a conductive ground plane having a main axis extending perpendicularly to the conductive ground plane;
- at least one active radiator which is axially spaced from the conductive ground plane in one direction,
- a metamaterial ground plane assembly comprising:
  - a metamaterial ground plane having a periphery;
  - a first conductive wall immediately adjacent the periphery of the metamaterial ground plane, the first conductive wall having a bottom and a top; and
  - a second wall comprising at least two mutually electrically insulated conductive wall parts located spaced from and outside of the first conductive wall, the metamaterial ground plane assembly being arranged such that the bottom of the first conductive wall is located between the conductive ground plane and the metamaterial ground plane and the top of the conductive first wall is located beyond the at least one active radiator in the one direction; and
- at least one conductive pillar between the first conductive wall and the conductive ground plane.

Shape, dimensions and relative spacing of the conductive ground plane, the at least one active radiator and the metamaterial ground plane assembly are selected to improve antenna bandwidth, pattern consistency or stability and gain.

The conductive ground plane and the metamaterial ground plane may have any suitable shape, including a rectangular shape, but preferable a square shape, having four sides.

The first conductive wall preferably is a continuous wall having four sides circumscribing the metamaterial ground plane.

The at least one conductive pillar may extend between the bottom of the first conductive wall and a middle of at least one of the sides of the conductive ground plane.

In one embodiment, the at least one pillar may comprise at least two pillars extending from a middle of the bottom of at least two sides of the first conductive wall respectively to the middle of two sides of the conductive ground plane.

In a preferred embodiment, the at least one conductive pillar comprises four pillars extending respectively from the middle of the bottom of each side of the conductive first wall to the middle of an associated side of the conductive ground plane.

The second wall may comprise four electrically insulated conductive wall parts which are respectively located parallel to a corresponding one of the four sides of the first conductive wall.

The at least one active radiator may comprise at least one dipole radiator.

In a preferred embodiment, the at least one active radiator comprises first and second cross polarized dipole radiators, which are driven at respective centre points.

The antenna may also comprise at least one passive radiator which is spaced from the at least one active radiator in the one direction.

In the preferred embodiment, the at least one passive radiator is of the same shape and configuration as the at least one active radiator, but smaller in size.

The antenna may also comprise an active patch type radiator having a surface area and which active patch type radiator is axially spaced from the conductive ground plane in a direction opposite the one direction.

The surface area of the active patch type radiator is preferably larger than the surface area of the metamaterial ground plane assembly.

An optional passive patch type radiator may be provided between the active patch type radiator and the conductive ground plane.

BRIEF DESCRIPTION OF THE ACCOMPANYING DIAGRAMS

The invention will now further be described, by way of example only, with reference to the accompanying diagrams wherein.

Figure 9:
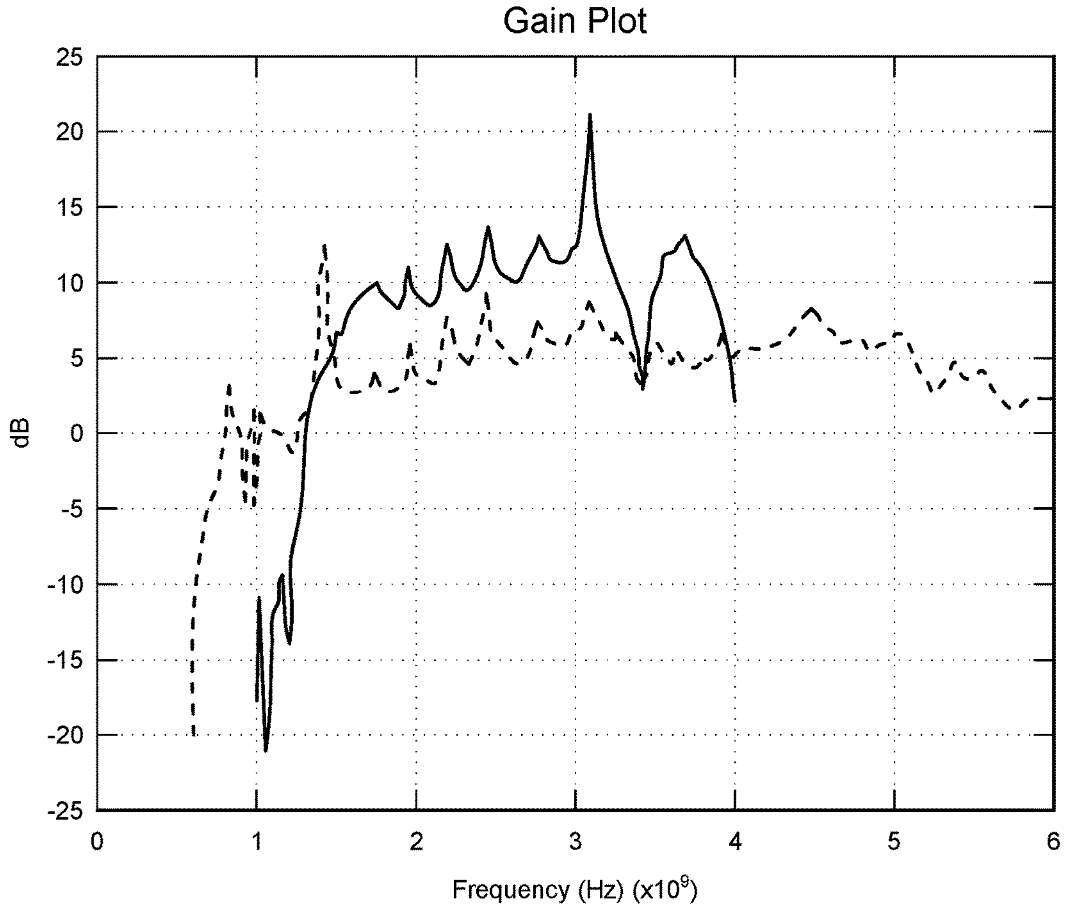
FIG. 9 is a plot of antenna gain against frequency for the example embodiment of the antenna compared to a similar antenna, but adapted to lack conductive pillars between the bottom of a first wall of the metamaterial ground plane assembly and the conductive ground plane of the antenna.
Figure 10A:
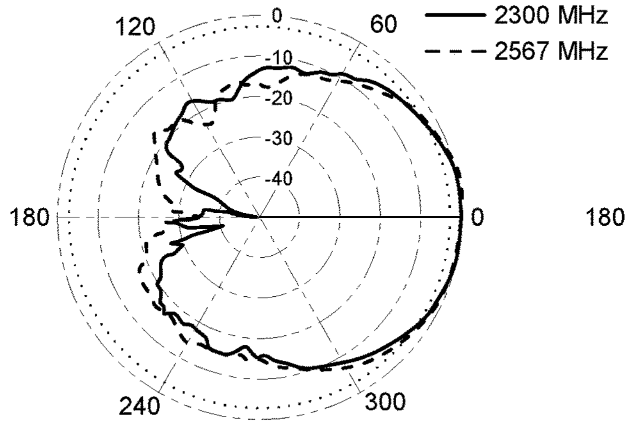
Figure 10B:
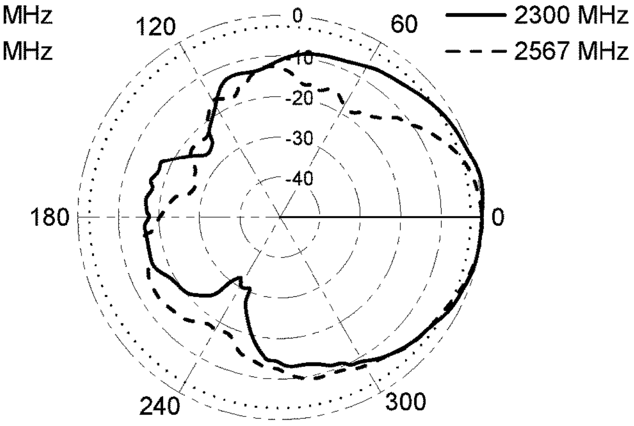
Figure 11A:
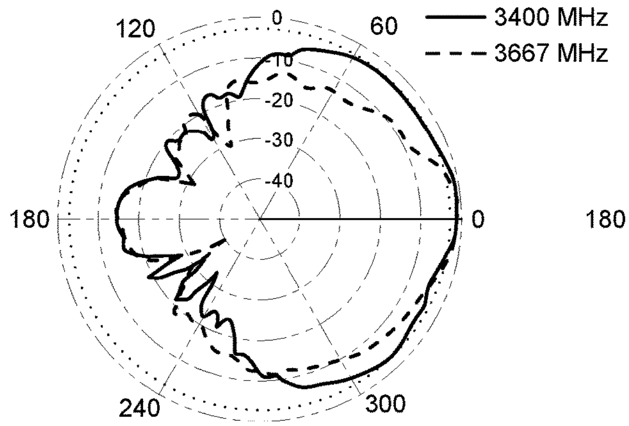
Figure 11B:
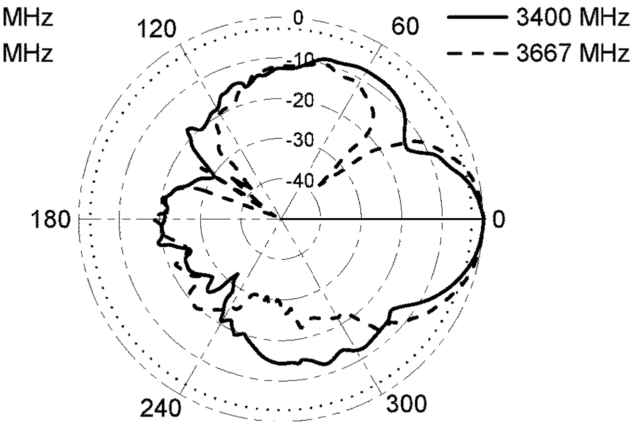
Figure 12:
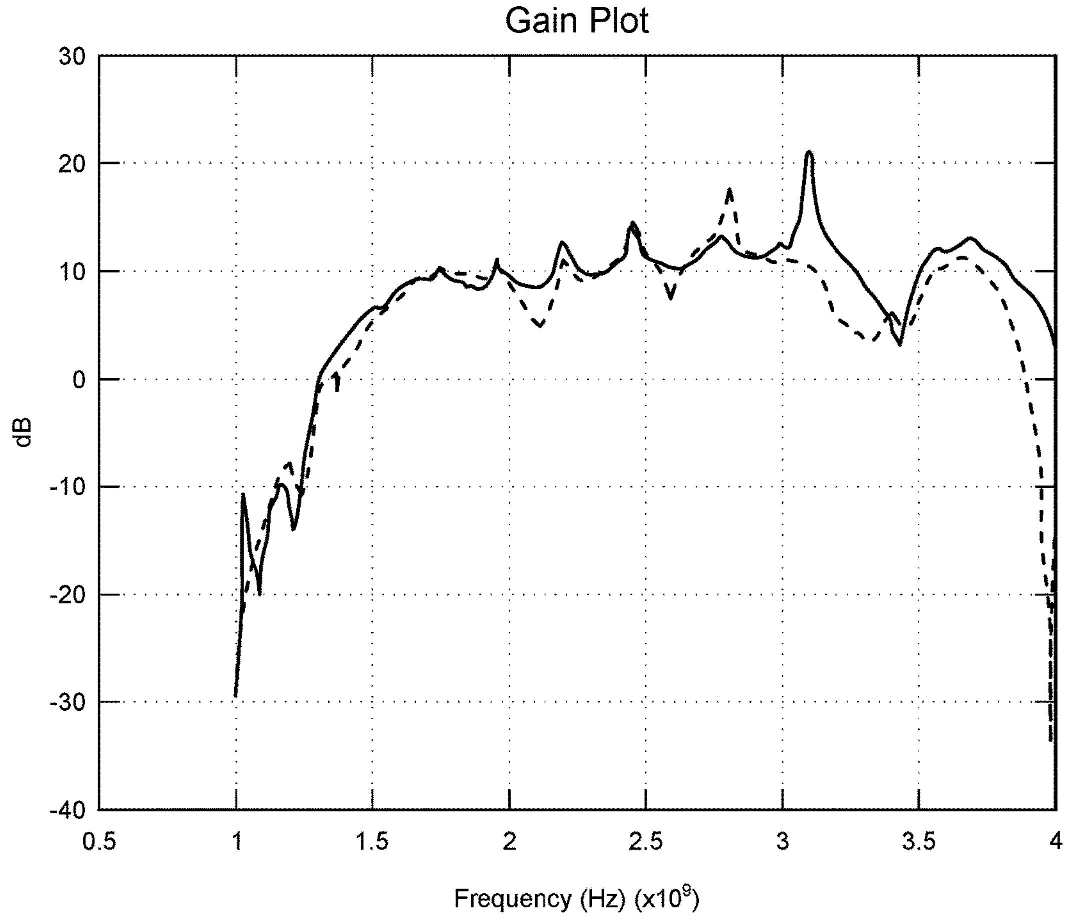
Figure 13A:
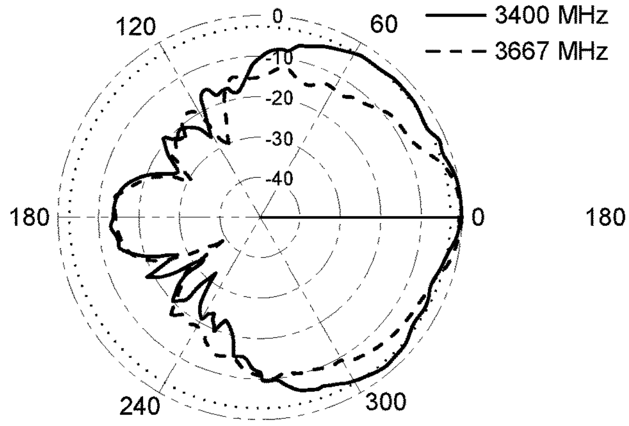
Figure 13B:
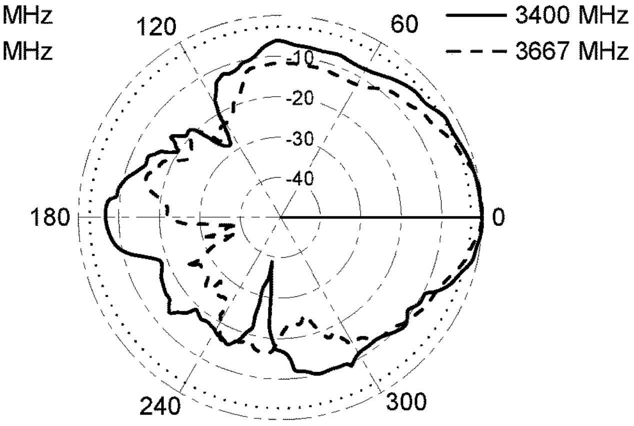

FIGS. 10(*a*) and (*b*) are polar plots for the antennas in FIG. 9 for a lower range of frequencies;

FIGS. 11(*a*) and (*b*) are also polar plots for the antennas in FIG. 9 for a higher range of frequencies;

FIG. 12 is a plot of antenna gain against frequency for the example embodiment of the antenna compared to a similar antenna adapted to lack a passive radiator of the example embodiment; and FIGS. 13(*a*) and (*b*) are polar diagrams for the antennas in FIG. 12.

DESCRIPTION OF A PREFERRED EMBODIMENT OF THE INVENTION

An example embodiment of a broad band directional antenna is generally designated by the reference numeral 10 in FIGS. 1, 6, 7 and 8.

Figure 1:
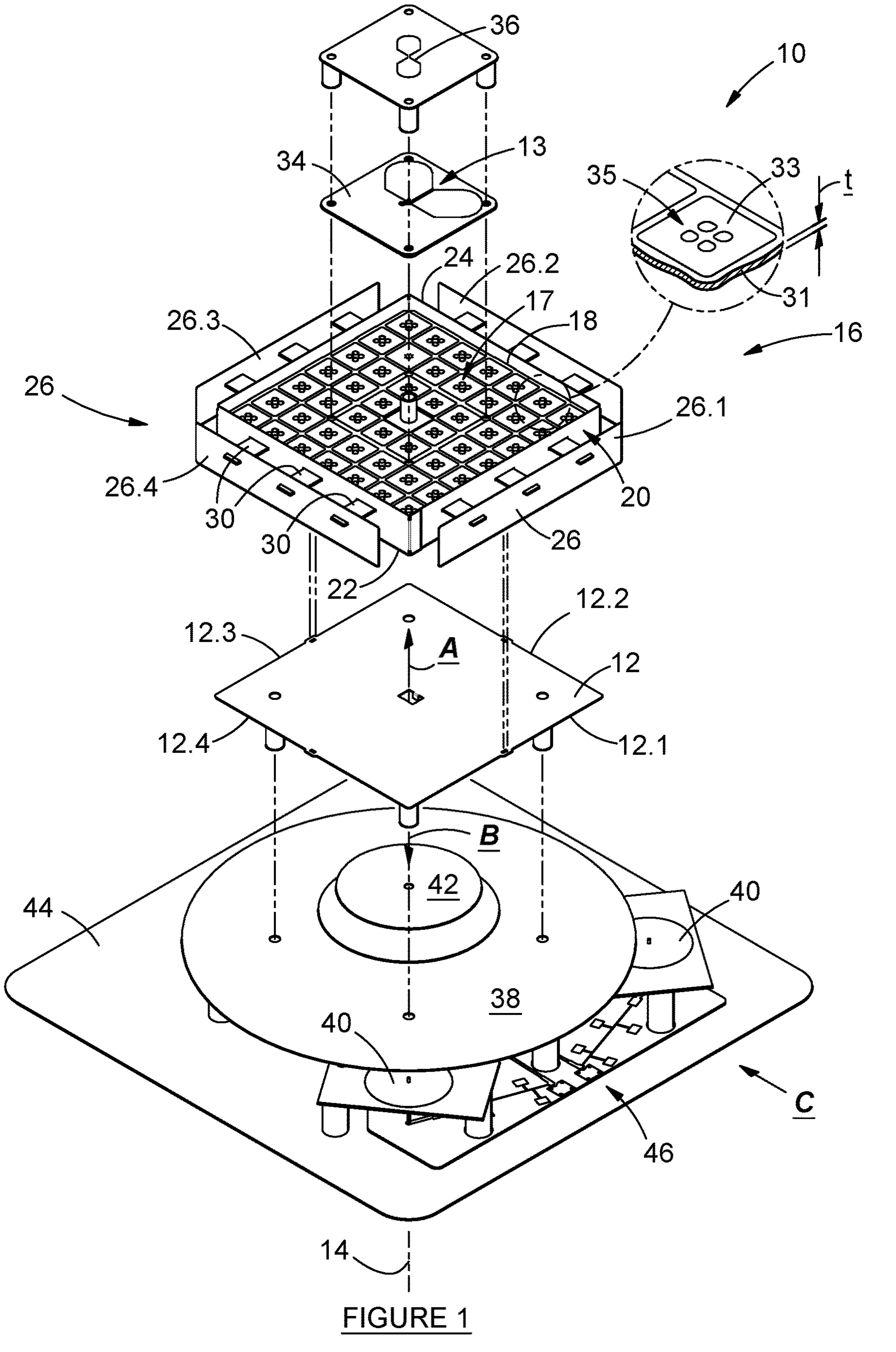
FIG. 1 is an exploded perspective view of an example embodiment of a broad band directional antenna.

Referring to FIG. 1, the antenna comprises a conductive ground plane 12 having a main axis 14 extending perpendicularly to the conductive ground plane 12. At least one active radiator 13 is axially spaced from the conductive ground plane in one direction A. A metamaterial ground plane assembly 16 has a surface area. The metamaterial ground plane assembly comprises a metamaterial ground plane 17 having a periphery 18. A first conductive wall 20 is located immediately adjacent the periphery 18, such that the first conductive wall 20 abuts the periphery of the metamaterial ground plane 17. The first conductive wall has a bottom 22 and a top 24. A second wall 26 comprising at least two mutually electrically insulated conductive wall parts 26.1 and 26.2 is located spaced from and outside of the first conductive wall 20 relative to the metamaterial ground plane 17. The metamaterial ground plane assembly 16 is arranged such that the bottom 22 of the first conductive wall 20 is located between the conductive ground plane 12 and the metamaterial ground plane 17 and the top 24 of the conductive first wall 20 is located beyond the at least one active radiator 13 in the one direction A. There is provided at least one conductive pillar 28.1 (see FIGS. 2 and 3) between the bottom 22 of the first conductive wall 20 and the conductive ground plane 12.

In the example embodiment, the metamaterial ground plane 17 comprises an electrically insulating substrate 31 and a plurality of mutually spaced rectangular or square conductive pads 33 printed on the substrate in a matrix pattern. Each pad defines a matrix of four holes exposing the underlying substrate. It has been found that a thickness t of the substrate should preferably be as small as possible, without compromising a mechanical strength of the substrate that may be required. A conventional printed circuit board with copper pads may be used.

As will become clearer below, the conductive ground plane 12 and the metamaterial ground plane assembly 16 may have any suitable shape and/or dimensions. However, shape, dimensions and relative spacing of the conductive ground plane 12, the at least one active radiator 13 and the metamaterial ground plane assembly 16 and its constituent parts are selected to improve antenna bandwidth, pattern consistency or stability and gain.

In the example embodiment shown, the conductive ground plane 12 is square having four equi-dimensioned sides 12.1, 12.2, 12.3 and 12.4.

Figure 2:
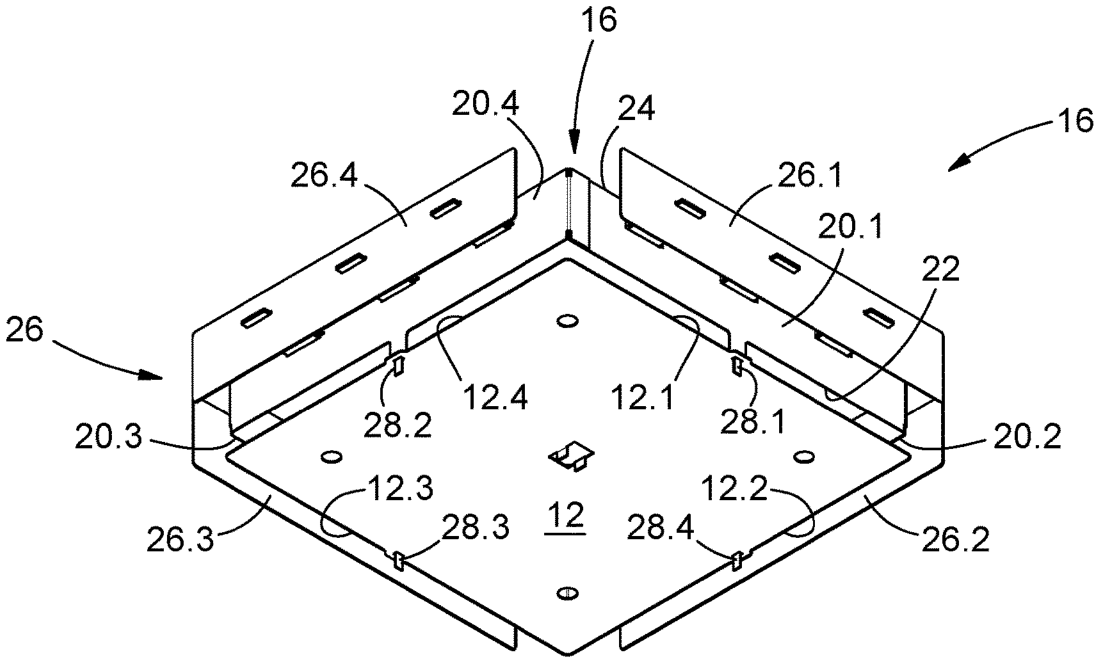
FIG. 2 is a perspective view from below of a conductive ground plane and a metamaterial ground plane assembly of the antenna.
Figure 3:
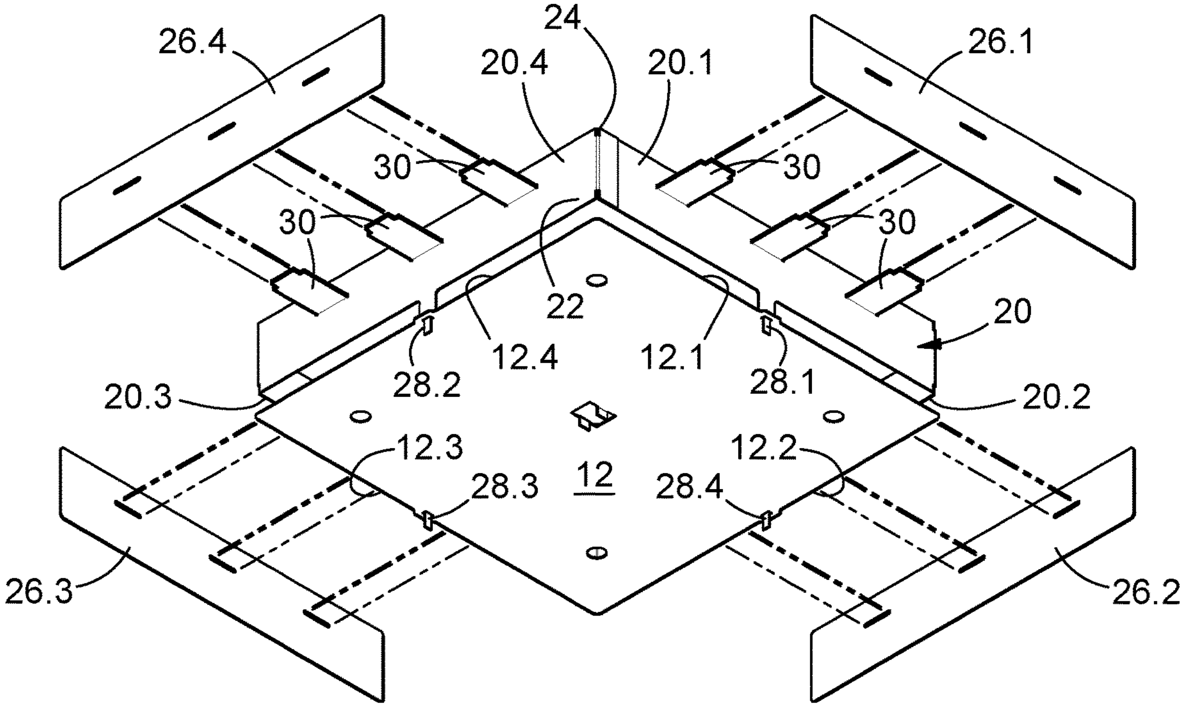
FIG. 3 is a view similar to that of FIG. 2, partially exploded.

As best shown in FIGS. 2 and 3, the first conductive wall 20 is a continuous wall having four first wall parts 20.1, 20.2, 20.3 and 20.4 circumscribing the metamaterial ground plane 17. Also as shown in these figures, there is provided a conductive pillar 28.1 between first wall part 20.1 of wall 20 and the middle of corresponding side 12.1 of the conductive ground plane 12. Similarly, there are provided conductive pillars 28.2 to 28.4 between first wall parts 20.2 to 20.4 of wall 20 and the middle of corresponding sides 12.2 to 12.4 of the conductive ground plane 12.

As best shown in FIGS. 1 to 3, the second wall comprises mutually insulated wall parts 26.1 to 26.4. In the example embodiment shown, wall part 26.1 extends parallel to first wall part 20.1 of first wall 20. Similarly, parts 26.2 to 26.4 extend parallel to first wall parts 20.2 to 20.4 respectively. Each of the wall parts 26.1 to 26.4 are secured to the metamaterial ground plane 17 by insulating arms 30.

Figure 4:
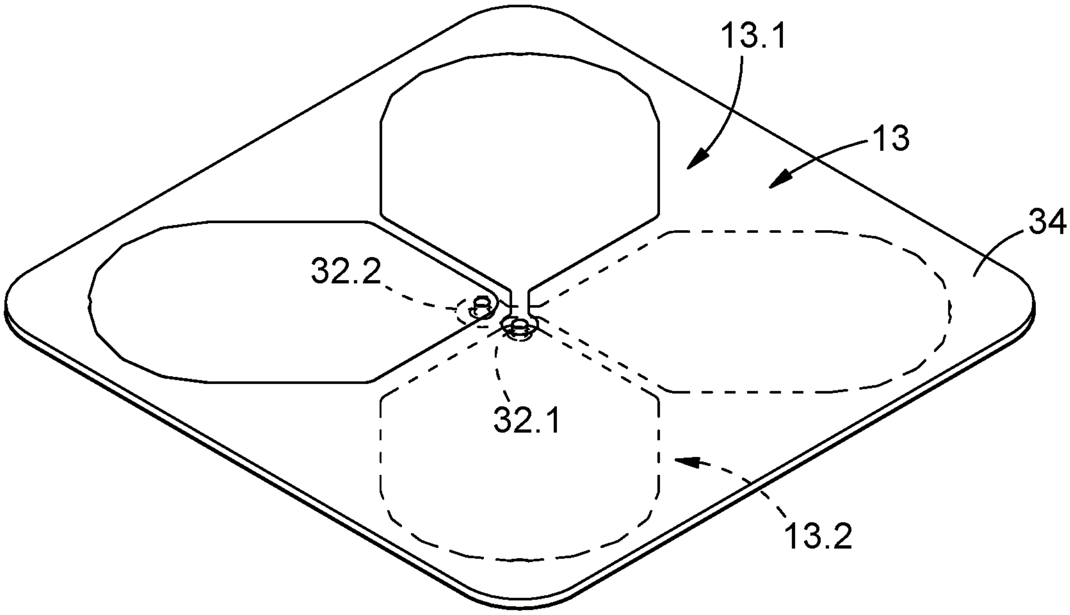
FIG. 4 is a perspective view of cross polarized active radiators of the antenna provided on a top and bottom surface respectively of a substrate.
Figure 5:
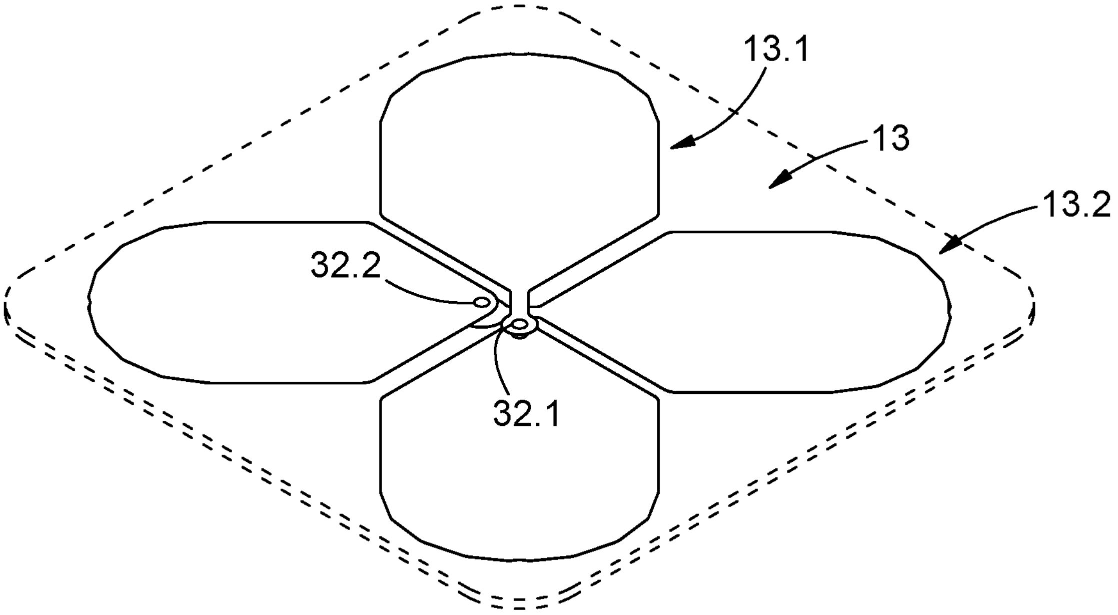
FIG. 5 is another perspective view of the cross polarized active radiators with the substrate in phantom, for better clarity.

Referring to FIGS. 1, 4 and 5, the at least one active radiator 13 comprises first and second cross polarized dipole radiators 13.1 and 13.2 which are driven at respective centre points 32.1 and 32.2. One conductive element of each of the dipoles is provided on a top surface of substrate 34, whereas the other element is provided on a bottom surface of the substrate.

Figure 6:
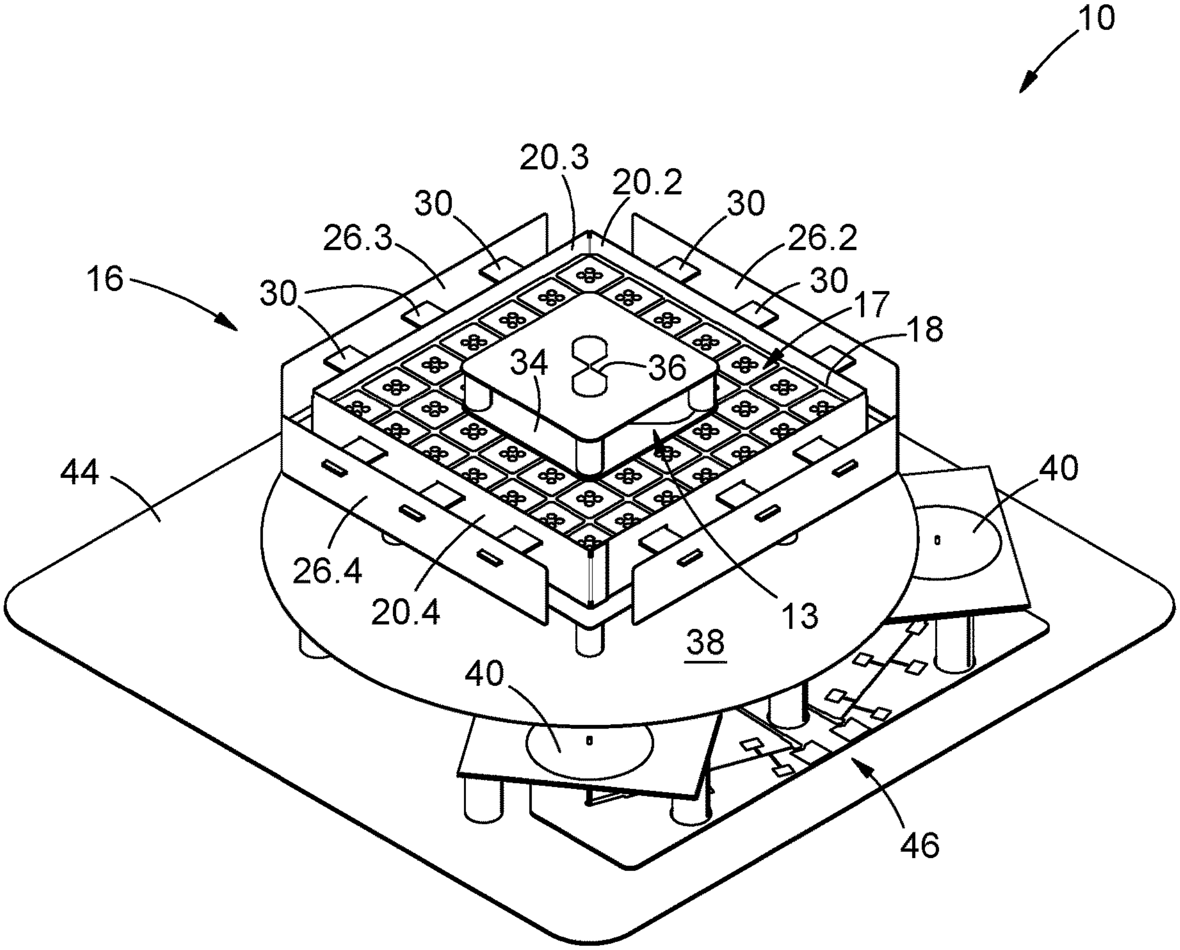
FIG. 6 is perspective view of the antenna in assembled form.
Figure 7:
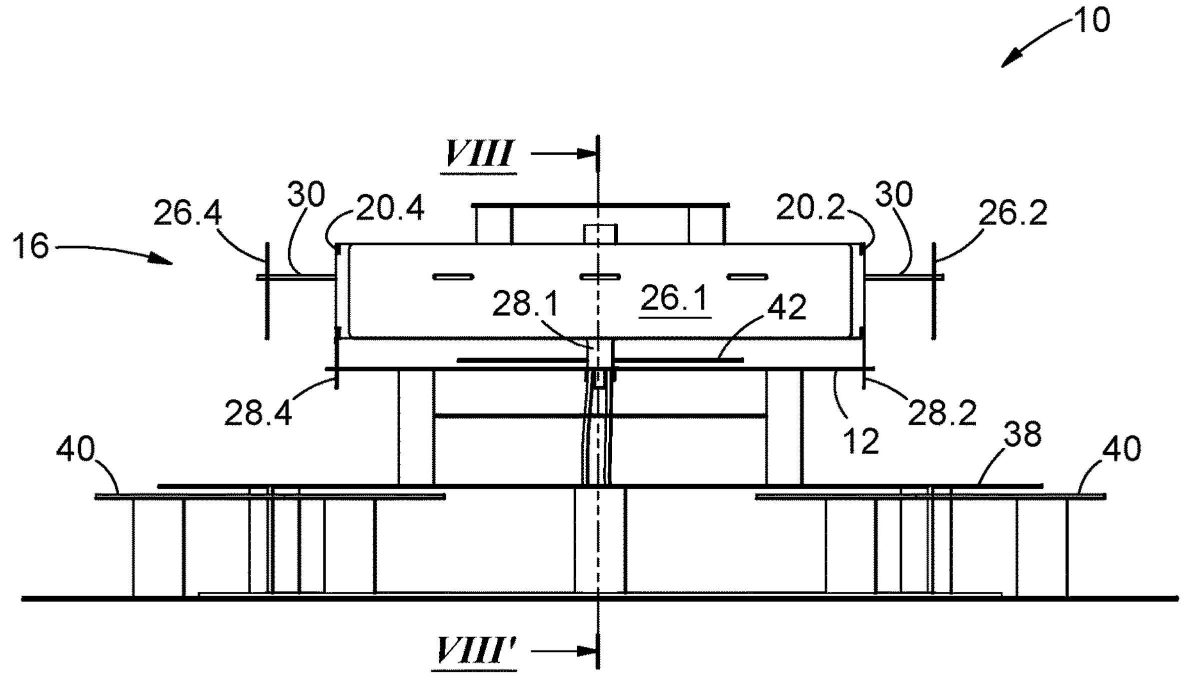
FIG. 7 is a diagrammatic side view of the antenna in the direction C shown in FIG. 1.
Figure 8:
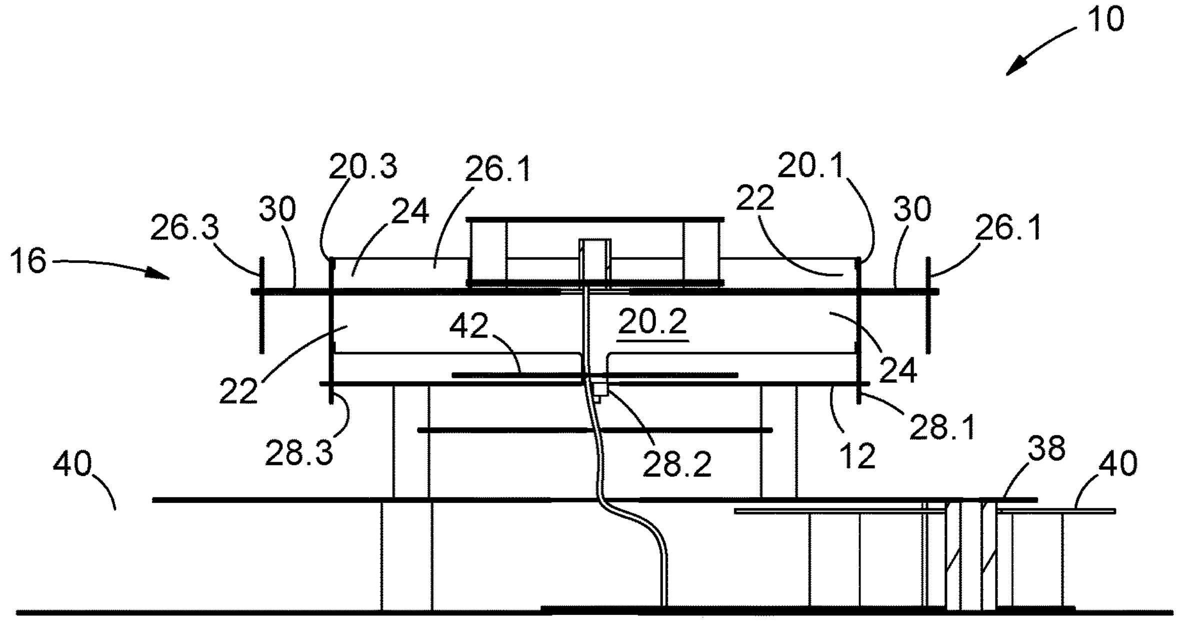
FIG. 8 is a section on line VIII in FIG. 7.

Referring to FIGS. 1 and 6, the example embodiment of the antenna 10 comprises at least one passive radiator 36 which is spaced from the at least one active radiator 30 in the one direction A. In a preferred embodiment, the at least one passive radiator is of the same shape and configuration as the at least one active radiator, but smaller in size.

Referring to FIGS. 1, 6, 7 and 8, the example embodiment of antenna 10 comprises an active low frequency patch type radiator 38 having a surface area and which patch type radiator 38 is axially spaced from the conductive ground plane 12 in a direction B opposite the one direction A. The surface area of the patch type radiator 38 is preferably larger than the surface area of the metamaterial ground plane assembly 16. Known feeds for the patch type radiator are shown at 40.

Still referring to FIGS. 1, 6, 7 and 8, the example embodiment of the antenna 10 may comprise an optional passive patch type radiator 42 which may be provided between the active patch type radiator 38 and the conductive ground plane 12.

The example embodiment of the antenna 10 further comprises a known support structure 44 with diplexer 46, which structure is spaced from the patch type radiator 38 in the other or opposite direction B.

The example embodiment of the antenna 10 is designed to operate in the frequency band 1.7 GHz to 3.7 GHz.

In FIG. 9, there is shown a plot of antenna gain against frequency (shown by the solid line) for the example embodiment of the antenna 10 with the conductive pillars 28.1 to 28.4 in position as shown in FIGS. 2 and 3 compared to that (shown in broken lines) of an adapted antenna without such pillars, but with bottom 22 of the first wall 20 in conductive contact with conductive ground plane 12, thereby effectively cavity backing the metamaterial ground plane. The graph clearly indicates a large increase in gain of about 5 dB for frequencies below 3.2 GHz for the example embodiment of the antenna. The polar diagrams in FIGS. 10(*a*), 10(*b*), 11(*a*) and 11(*b*) also clearly illustrate far more stable radiation patterns for the case in FIG. 10(*a*) and FIG. 11(*a*) with the conductive pillars, as opposed to the case in FIGS. 10(*b*) and 11(*b*) with the bottom 22 of wall 20 in direct contact with the conductive ground plane 12.

It is believed that the pillars 28.1 to 28.4 serve to suppress pseudo surface waves that propagate on the conductive ground plane 12 and which cause unwanted radiation and thereby negatively affects the radiation pattern.

In FIG. 12, there is shown a plot of antenna gain against frequency (shown by the solid line in FIG. 12 for the example embodiment of the antenna 10 compared to that (shown in broken lines) of a similar antenna, but adapted to lack the passive radiator 36. The plot clearly indicates an increase in bandwidth for the antenna with the passive radiator 36. The polar diagrams in FIG. 13(*a*) (for the example embodiment of the antenna) and FIG. 13(*b*) (for the adapted antenna) also illustrate more stable radiation patterns for the case in FIG. 13(*a*) with the radiator 36, as opposed to the case without the radiator in FIG. 13(*b*).

It has also been found that the parasitic dipole 36 increases the gain by 4-5 dB in the frequency band 3.4 GHz-3.8 GHz.

The invention claimed is:

1. A broad band directional antenna comprising:

- a conductive ground plane having a main axis extending perpendicularly to the conductive ground plane;
- at least one active radiator which is axially spaced from the conductive ground plane in one direction,
- a metamaterial ground plane assembly comprising:
  - a metamaterial ground plane having a periphery;
  - a first conductive wall immediately adjacent the periphery of the metamaterial ground plane, the first conductive wall having a bottom and a top; and
  - a second wall comprising at least two mutually electrically insulated conductive wall parts located spaced from and outside of the first conductive wall, the metamaterial ground plane assembly being arranged such that the bottom of the first conductive wall is located between the conductive ground plane and the metamaterial ground plane and the top of the first conductive wall is located beyond the at least one active radiator in the one direction; and
- at least one conductive pillar between the first conductive wall and the conductive ground plane.

2. The antenna as claimed in claim 1 wherein at least one of the conductive ground plane and the metamaterial ground plane is rectangular in shape.

3. The antenna as claimed in claim 2 wherein both the conductive ground plane and the metamaterial ground plane are square in shape, respectively having first, second, third and fourth sides and wherein the first side of the conductive ground plane is parallel to the first side of the metamaterial ground plane.

4. The antenna as claimed in claim 1 wherein the first conductive wall abuts the periphery of the metamaterial ground plane.

5. The antenna as claimed in claim 2 wherein the at least one conductive pillar extends between a bottom of the first conductive wall and a middle of at least one of the sides of the conductive ground plane.

6. The antenna as claimed in claim 2 wherein the first conductive wall is a continuous wall circumscribing the metamaterial ground plane, the continuous wall comprising four first wall parts, each wall part having a respective bottom.

7. The antenna as claimed in claim 6 comprising at least two pillars extending from a middle of the bottom of at least two of the four first wall parts respectively to the middle of at least two sides of the conductive ground plane, respectively.

8. The antenna as claimed in claim 6 comprising four pillars extending respectively from a middle of the bottom of each of the four first wall parts respectively to the middle of a respective side of the conductive ground plane.

9. The antenna as claimed in claim 6 wherein the second wall comprises four electrically insulated conductive wall parts which are respectively located parallel to a corresponding one of the four first wall parts.

10. The antenna as claimed in claim 1 wherein the at least one active radiator comprises at least one dipole radiator.

11. The antenna as claimed in claim 10 wherein the at least one active radiator comprises first and second cross polarized dipole radiators, which are driven at respective centre points.

12. The antenna as claimed in claim 1 comprising at least one passive radiator which is axially spaced from the at least one active radiator in the one direction.

13. The antenna as claimed in claim 12 wherein the at least one passive radiator is of a shape and configuration similar to that of the at least one active radiator, but smaller in size.

14. The antenna as claimed in claim 1 comprising an active patch type radiator having a surface area and which active patch type radiator is axially spaced from the conductive ground plane in a direction opposite the one direction.

15. The antenna as claimed in claim 14 wherein the surface area of the active patch type radiator is larger than a surface area of the metamaterial ground plane assembly.

16. The antenna as claimed in claim 14 wherein a passive patch type radiator is provided between the active patch type radiator and the conductive ground plane.

* * * * *